United States Patent
Wan et al.

(10) Patent No.: US 11,632,843 B2
(45) Date of Patent: Apr. 18, 2023

(54) DELAYED LIGHTING SYSTEM

(71) Applicant: SENGLED CO., LTD., Shanghai (CN)

(72) Inventors: Yehua Wan, Shanghai (CN); Yuliang Cai, Shanghai (CN)

(73) Assignee: SENGLED CO., LTD., Shanghai (CN)

( * ) Notice: Subject to any disclaimer, the term of this patent is extended or adjusted under 35 U.S.C. 154(b) by 36 days.

(21) Appl. No.: 17/356,494

(22) Filed: Jun. 23, 2021

(65) Prior Publication Data

US 2021/0360764 A1  Nov. 18, 2021

(30) Foreign Application Priority Data

Apr. 23, 2020  (CN) .......................... 202010327324.1

(51) Int. Cl.
*H05B 47/16* (2020.01)
*H05B 45/3725* (2020.01)

(52) U.S. Cl.
CPC ......... *H05B 47/16* (2020.01); *H05B 45/3725* (2020.01)

(58) Field of Classification Search
None
See application file for complete search history.

(56) References Cited

U.S. PATENT DOCUMENTS 10,470,266 B1 * 11/2019 Li ........................... H05B 45/48
2021/0360764 A1 * 11/2021 Wan ....................... H05B 45/30

* cited by examiner

*Primary Examiner* — Dedei K Hammond
(74) *Attorney, Agent, or Firm* — Anova Law Group, PLLC

(57) ABSTRACT

A delayed lighting system includes a light emitting circuit; a main power supply circuit connected to the light emitting circuit; a delayed lighting circuit; an energy storage circuit configured to store electrical energy from a mains electricity when the main power supply circuit supplies power to the light emitting circuit; and a control circuit connected to the energy storage circuit, the light emitting circuit, and the delayed lighting circuit respectively. When the main power supply circuit stops supplying power to the light emitting circuit, the control circuit is configured to control the energy storage circuit to supply power to the delayed lighting circuit and the delayed lighting circuit is configured to emit light.

8 Claims, 7 Drawing Sheets

DELAYED LIGHTING SYSTEM

CROSS-REFERENCE TO RELATED APPLICATION

This application claims the priority of Chinese Patent Application No. 202010327324.1, filed on Apr. 23, 2020, the content of which is incorporated herein by reference in its entirety.

TECHNICAL FIELD

The present disclosure relates to a field of lighting technology and, in particular, to a delayed lighting system.

BACKGROUND

A light-emitting-diode (LED) lighting device uses LED as a light source. LED is a solid-state semiconductor device that can convert electrical energy into visible light. The LED includes a semiconductor chip, and one terminal of the semiconductor chip is attached to a bracket. The one end is a cathode, and the other end is connected to an anode of a power supply, so that the entire chip is encapsulated by epoxy resin.

The LED lighting device has a long lifetime, a good applicability, and a small size of a single LED, which makes it possible to be made into any shape. The LED lighting device also has a short response time at a level of nanosecond (ns), while the response time of ordinary light is at a level of millisecond (ms). The LED lighting device is environment friendly and includes no harmful metals, which make its waste easy to be recycled. The LED light device has brilliant colors, pure colors, and narrow spectral ranges, and can generate colorful or white light by mixing the three primary colors of red, green and blue. Because of the above characteristics, the LED lighting device has been widely used in various fields.

In actual use, when a lighting circuit of the LED lighting device is turned off, the external power no longer supplies power to the LED lighting device, the LED lighting device is immediately turned off without a delayed lighting capability.

SUMMARY

In accordance with the disclosure, there is provided a delayed lighting system. The system includes a light emitting circuit; a main power supply circuit connected to the light emitting circuit; a delayed lighting circuit; an energy storage circuit configured to store electrical energy from a mains electricity when the main power supply circuit supplies power to the light emitting circuit; and a control circuit connected to the energy storage circuit, the light emitting circuit, and the delayed lighting circuit respectively. When the main power supply circuit stops supplying power to the light emitting circuit, the control circuit is configured to control the energy storage circuit to supply power to the delayed lighting circuit and the delayed lighting circuit is configured to emit light.

REFERENCE NUMERALS

10—Lighting Device 11—Mains Electricity 100—Delayed lighting System 101—Delayed Power Supply circuit 110—Light Emitting circuit 120—Energy Storage circuit 130—Control circuit 140—Delayed lighting circuit 150—Main Power Supply Circuit 160—Sampling circuit 170—First Control Switch 180—Instantaneous Discharge circuit 181—Second Control Switch 190—Voltage-regulator circuit 111—First Light-Emitting Sub-circuit 112—Second Light-Emitting Sub-circuit 12—Rectifier circuit 13—Current Regulation circuit 14—De-ripple circuit

DETAILED DESCRIPTION OF THE EMBODIMENTS

The technical solutions in the example embodiments of the present disclosure will be described clearly with reference to the accompanying drawings. The described embodiments are only some of the embodiments of the present disclosure, rather than all the embodiments. Based on the embodiments of the present disclosure, all other embodiments obtained by a person of ordinary skill in the art without creative efforts shall fall within the scope of the present disclosure.

A delayed lighting system according to an embodiment of the disclosure is suitable for any lighting device, for example, an LED lighting device.

Figure 1:
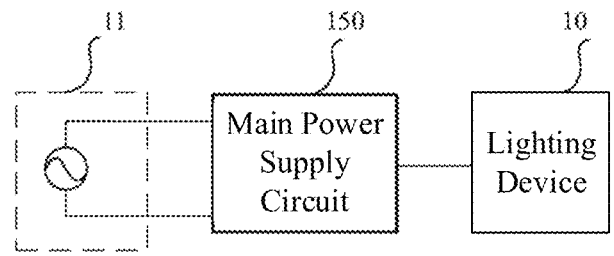
FIG. 1 is a schematic diagram of an existing lighting system.

FIG. 1 is a schematic diagram of an existing lighting system. The lighting system includes a main power supply circuit 150 and a lighting device 10. The main power supply circuit 150 is respectively connected to a mains electricity 11 and the lighting device 10. When the main power supply circuit 150 works, the electricity of the mains electricity 11 is converted into electricity needed by the lighting device 10 to supply power for the lighting device 10. When the main power supply circuit 150 is turned off, the external mains electricity 11 no longer supplies power to the lighting device 10. The lighting device 10 is turned off immediately, and a delayed lighting cannot be realized. There are safety risks when users move in the dark.

In order to solve the above technical problems, the delayed lighting system provided by the embodiments of the present disclosure is equipped with an energy storage circuit, a delayed lighting circuit and a control circuit. When the main power supply circuit supplies power to a light emitting circuit, the mains electricity charges the energy storage circuit. When the main power supply circuit stops supplying power to the light emitting circuit, the energy storage circuit supplies power to the delayed lighting circuit, so that the delayed lighting circuit can continue/extend the lighting after the light emitting circuit is turned off to avoid safety risks caused by users moving in the dark.

The following describes concepts involved in the disclosure with reference to the accompanying drawings. The following explanation of each concept is only to make the content of the disclosure easier to understand, and does not mean to limit the scope of the present disclosure.

In the present disclosure, the terms such as "first," "second," and "third," etc. are used to distinguish similar entities, and are not necessarily used to describe a specific sequence or priority. It should be understood that the data used in this way can be interchanged under appropriate circumstances, for example, it can be implemented in a sequence other than those given in the embodiments of the present disclosure.

In addition, the terms "including," "comprising," and any other variation thereof are non-exclusive inclusion, such that a product, or device that include a series of elements include not only those elements but also other elements that are not explicitly listed, or elements that are inherent to such a product, or device.

Figure 2:
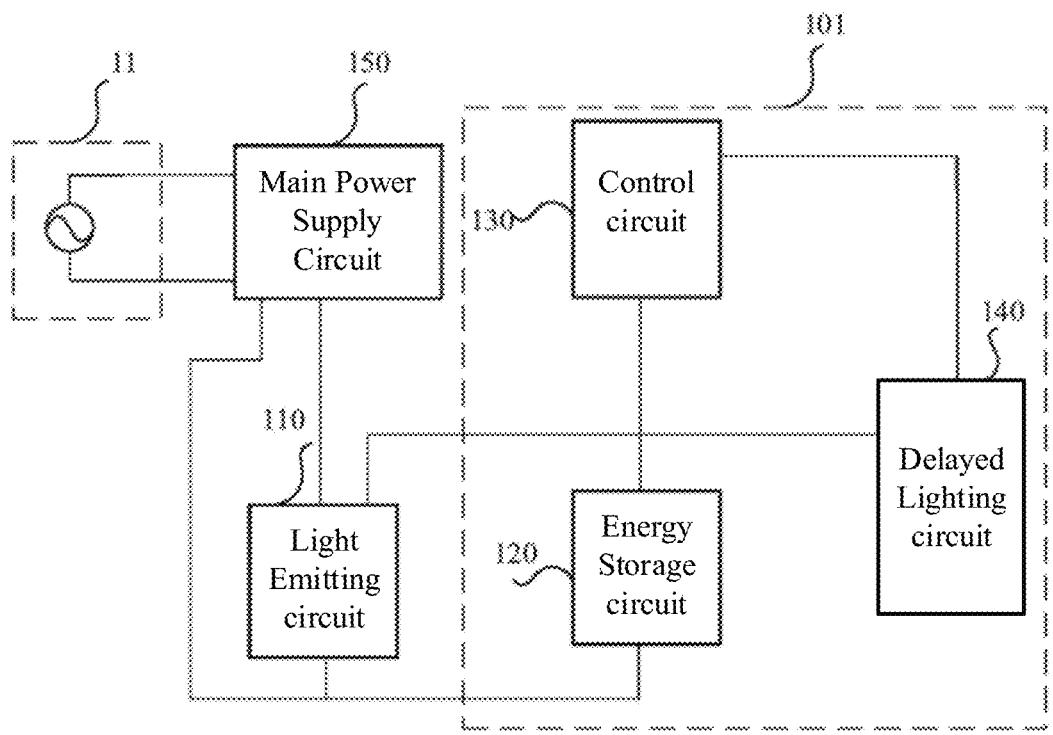
FIG. 2 is a schematic diagram of a delayed lighting system according to an embodiment of the disclosure.

FIG. 2 is a schematic diagram of a delayed lighting system 100 according to an embodiment of the disclosure. As shown in FIG. 2, the delayed lighting system 100 includes a light emitting circuit 110, a main power supply circuit 150, and a delayed power supply circuit 101. The delayed power supply circuit 101 includes an energy storage circuit 120, a control circuit 130, and a delayed lighting circuit 140.

The main power supply circuit 150 is connected to the light emitting circuit 110, and is used to convert the electrical energy of the mains electricity 11 into the electrical energy needed by the light emitting circuit 110 to supply power to the light emitting circuit 110.

The control circuit 130 is respectively connected to the light emitting circuit 110, the energy storage circuit 120, and the delayed lighting circuit 140.

The energy storage circuit 120 is configured to store the electrical energy from the mains electricity 11 in the energy storage circuit 120 when the main power supply circuit 150 supplies power to the light emitting circuit 110, that is, to charge the energy storage circuit 120.

The control circuit 130 is also used to control the energy storage circuit 120 to supply power to the delayed lighting circuit 140 when the main power supply circuit 150 stops supplying power to the light emitting circuit 110.

The method that the control circuit 130 controls the energy storage circuit 120 to supply power to the delayed lighting circuit 140 includes, but is not limited to the followings.

In some embodiments, the energy storage circuit 120 includes a management circuit (not shown in the figure). The management circuit is configured to control a connection and disconnection between the energy storage circuit 120 and an external load, and monitor information such as the electrical energy of the energy storage circuit 120, etc. In this way, when the control circuit 130 detects that the main power supply circuit 150 stops supplying power to the light emitting circuit 110, a power supply instruction is sent to the management circuit of the energy storage circuit 120. The power supply instruction indicating that power supply is needed for the delayed lighting circuit 140. For example, the power supply instruction may be 1. When the management circuit of the energy storage circuit 120 receives the power supply instruction sent by the control circuit 130, it controls the energy storage circuit 120 to connect to the delayed lighting circuit 140 to form a circuit loop, so that the energy storage circuit 120 supplies power to the delayed lighting circuit 140.

Figure 3:
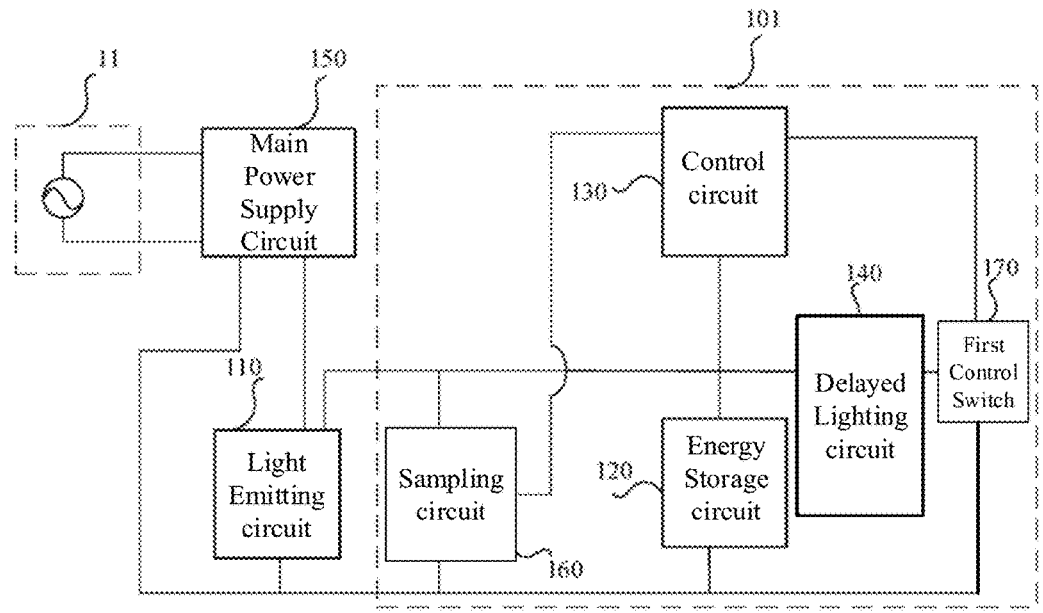
FIG. 3 is another schematic structural diagram of a delayed lighting system according to an embodiment of the disclosure.

In some embodiments, as shown in FIG. 3, the delayed lighting system 100 of the embodiments of the present disclosure may include a first control switch 170. The first control switch 170 is respectively connected to the control circuit 130, the delayed lighting circuit 140, and the energy storage circuit 120. The first control switch 170 includes three pins. One of the three pins is a control pin. The control pin is connected to the control circuit 130. The other two pins of the first control switch 170 are respectively connected to the energy storage circuit 120 and the delayed lighting circuit 140. The control circuit 130 inputs a turn-on instruction through the control pin of the first control switch 170, and controls the first control switch 170 to turn on. When the first control switch 170 is turned on, the energy storage circuit 120 is connected to the delayed lighting circuit 140, the energy storage circuit 120 supplies power to the delayed lighting circuit 140, and the delayed lighting circuit 140 emits light to realize delayed lighting.

In some embodiments, the first control switch 170 includes, but is not limited to, an NPN type transistor or a PNP type transistor.

The delayed lighting circuit 140 is configured to emit light when receiving power supply from the energy storage circuit 120, so as to realize the delayed lighting when the light emitting circuit 110 is turned off.

The light emitting circuit 110 can be understood as a main lighting module, that is, to illuminate when the mains electricity is normally supplied, and the delayed lighting circuit 140 can be understood as an auxiliary lighting module to illuminate when the main lighting module is not working.

When the main power supply circuit 150 is disconnected from the mains electricity 11, the energy storage circuit 120 supplies power to the control circuit 130, which ensures a normal operation of the control circuit 130.

In some embodiments, the control circuit 130 may be a separate control chip. Alternatively, the control circuit 130 may be a control chip of the main power supply circuit 150, that is, the delayed power supply circuit 101 and the main power supply circuit 150 share a same control chip.

In some embodiments, the delayed lighting circuit 140 may be an LED lamp, for example, an LED lamp bead, an LED module, or an LED light bar.

In some embodiments, the light emitting circuit 110 may be an LED lamp, for example, an LED lamp bead, an LED module, or an LED light bar.

The delayed lighting system 100 according to the embodiments of the present disclosure is provided with the light emitting circuit 110, the energy storage circuit 120, the control circuit 130, the delayed lighting circuit 140, and the main power supply circuit 150 connected to the light emitting circuit 110. The control circuit 130 is respectively connected to the energy storage circuit 120, the light emitting circuit 110 (e.g., directly or through a sampling circuit), and the delayed lighting circuit 140. The energy storage circuit 120 is used to store the electrical energy of the mains electricity 11 to the energy storage circuit 120 when the main power supply circuit 150 supplies power to the light emitting circuit 110. The control circuit 130 is used to directly or indirectly control the energy storage circuit 120 to supply power to the delayed lighting circuit 140 when the main power supply circuit 150 stops supplying power to the light emitting circuit 110, so that the delayed lighting circuit 140 emits light. The delayed lighting system 100 can realize that when the light emitting circuit 110 stops illuminating, the delayed lighting circuit 140 continues the lighting, thereby avoiding the safety risks caused by users moving in the dark and improving the user's lighting experience.

FIG. 3 is another schematic structural diagram of a delayed lighting system 100 according to an embodiment of the disclosure. As shown in FIG. 3, the delayed lighting system 100 in some embodiments of the present disclosure may include a sampling circuit 160. The sampling circuit 160 is respectively connected to the control circuit 130 and at least one lamp bead of the light emitting circuit 110.

The sampling circuit 160 is configured to collect an electrical signal of at least one lamp bead of the light emitting circuit 110 in real time, for example, to collect a voltage signal or a current signal of at least one lamp bead of the light emitting circuit 110, and send the collected electrical signal to the control circuit 130.

The control circuit 130 is configured to determine whether the main power supply circuit 150 supplies power to the light emitting circuit 110 according to the electrical signal collected by the sampling circuit 160.

In some embodiments, when the main power supply circuit 150 supplies power to the light emitting circuit 110, the electrical signal (for example, a voltage signal) of at least one lamp bead of the light emitting circuit 110 collected by the sampling circuit 160 is a first electrical signal. The sampling circuit 160 sends the collected first electrical signal to the control circuit 130. The control circuit 130 determines that the first electrical signal collected by the sampling circuit 160 matches a first preset electrical signal, and then determines that the main power supply circuit 150 supplies power to the light emitting circuit 110.

When the main power supply circuit 150 stops supplying power to the light emitting circuit 110, the electrical signal (for example, a voltage signal) of at least one lamp bead of the light emitting circuit 110 collected by the sampling circuit 160 is a second electrical signal. The sampling circuit 160 sends the collected second electrical signal to the control circuit 130. The control circuit 130 determines that the second electrical signal collected by the sampling circuit 160 matches a second preset electrical signal, and then determines that the main power supply circuit 150 stops supplying power to the light emitting circuit 110. At this time, the control circuit 130 controls the energy storage circuit 120 to connect to the delayed lighting circuit 140, so that the energy storage circuit 120 supplies power to the delayed lighting circuit 140, and the delayed lighting circuit 140 emits light to realize delayed lighting.

In some embodiments, the first preset electrical signal is a high-level signal (e.g., a signal having a value higher than a first preset threshold), and the second preset electrical signal is a low-level signal (e.g., a signal having a value lower than a second preset threshold). In some embodiments, the first preset electrical signal is a low-level signal, and the second preset electrical signal is a high-level signal. In some embodiments, the first preset electrical signal and the second preset electrical signal may be other values, which are not limited in the embodiments of the present disclosure, and are determined according to actual needs.

In some embodiments of the present disclosure, when the energy storage circuit 120 supplies power to the delayed lighting circuit 140 and the delayed lighting circuit 140 illuminates, the control circuit 130 is also configured to control the energy storage circuit 120 to stop supplying power to the delayed lighting circuit 140 when the delayed lighting meets a preset condition.

In some embodiments, the delayed lighting meeting the preset condition includes at least one of remaining electrical energy of the energy storage circuit 120 being lower than a preset electrical energy value, a voltage of the energy storage circuit 120 dropping below a preset voltage value, or a lighting duration of the delayed lighting circuit 140 reaching a preset duration.

For example, when the control circuit 130 detects that the remaining electrical energy of the energy storage circuit 120 is lower than the preset electrical energy value, the control circuit 130 controls the energy storage circuit 120 to stop supplying power to the delayed lighting circuit 140, thereby preventing the energy storage circuit 120 from running out of power and being not able to supply power to the control circuit 130.

For example, when the control circuit 130 detects that the lighting duration of the delayed lighting circuit 140 reaches the preset duration, the control circuit 130 controls the energy storage circuit 120 to stop supplying power to the delayed lighting circuit 140, thereby avoiding unneeded power supply for the delayed lighting circuit 140 for a long time and a problem of energy waste.

For example, when the control circuit 130 detects that the voltage of the energy storage circuit 120 is lower than the preset voltage value, the control circuit 130 controls the energy storage circuit 120 to stop supplying power to the delayed lighting circuit 140.

For example, when the control circuit 130 detects that the remaining electrical energy of the energy storage circuit 120 is lower than the preset electrical energy value, and the lighting duration of the delayed lighting circuit 140 reaches the preset duration, the energy storage circuit 120 is controlled to stop supplying power to the delayed lighting circuit 140.

The method that the control circuit 130 controls the energy storage circuit 120 to stop supplying power to the delayed lighting circuit 140 includes, but is not limited to the followings.

In some embodiments, the energy storage circuit 120 includes a management circuit (not shown in the figure). When the control circuit 130 detects that the delayed lighting meets the preset condition, a power supply stop instruction for stopping supplying power to the delayed lighting circuit 140 is sent to the management circuit of the energy storage circuit 120, for example, the power supply stop instruction may be 0. When the management circuit of the energy storage circuit 120 receives the power supply stop instruction sent by the control circuit 130, it controls the energy storage circuit 120 to disconnect from the delayed lighting circuit 140, so that the energy storage circuit 120 stops supplying power to the delayed lighting circuit 140.

In some embodiments, as shown in FIG. 3, when the control circuit 130 detects that the delayed lighting meets the preset condition, it outputs a disconnection instruction through the control pin of the first control switch 170, and controls the first control switch 170 to turn off, so that the energy storage circuit 120 is disconnected from the delayed lighting circuit 140, the energy storage circuit 120 stops supplying power to the delayed lighting circuit 140, and the delayed lighting circuit 140 stops emitting light.

In some embodiments of the present disclosure, the control circuit 130 can control the connection and disconnection between the energy storage circuit 120 and the delayed lighting circuit 140 by turning the on and off of the first control switch 170, so as to control an on/off state of the delayed lighting circuit 140.

Figure 4:
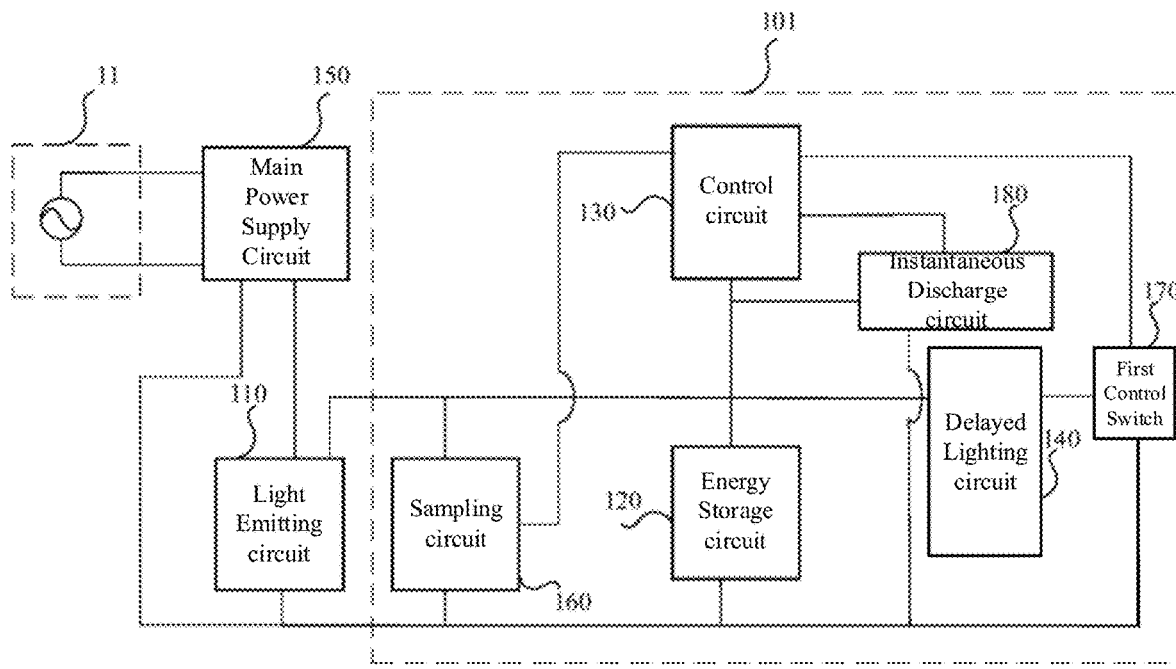
FIG. 4 is another schematic structural diagram of a delayed lighting system according to an embodiment of the disclosure.

In some embodiments, as shown in FIG. 4, the delayed lighting system 100 of some embodiments of the present disclosure may include an instantaneous discharge circuit 180. The control circuit 130 can also control the energy storage circuit 120 to be connected to the instantaneous discharge circuit 180, so that the electrical energy of the energy storage circuit 120 is instantly discharged. As a result, the energy storage circuit 120 stops supplying power to the delayed lighting circuit 140.

In some embodiments, the instantaneous discharge circuit 180 is connected to the control circuit 130, and is connected to the energy storage circuit 120 under the control of the control circuit 130. When the control circuit 130 detects that the delayed lighting meets the preset condition, for example, the control circuit 130 detects that the remaining electrical energy of the energy storage circuit 120 is lower than the preset electrical energy value, and/or the voltage of the energy storage circuit 120 drops to the preset voltage value, and/or the lighting duration of the delayed lighting circuit 140 meets the preset duration, the instantaneous discharge circuit 180 is controlled to connect to the energy storage circuit 120, so that the energy storage circuit 120 is instantaneously discharged. When the electrical energy of the energy storage circuit 120 is drained off, the energy storage circuit 120 stops supplying power to the delayed lighting circuit 140, and the delayed lighting circuit 140 is turned off.

A resistance value of the instantaneous discharge circuit 180 is lower than a resistance value of the delayed lighting circuit 140.

Figure 5:
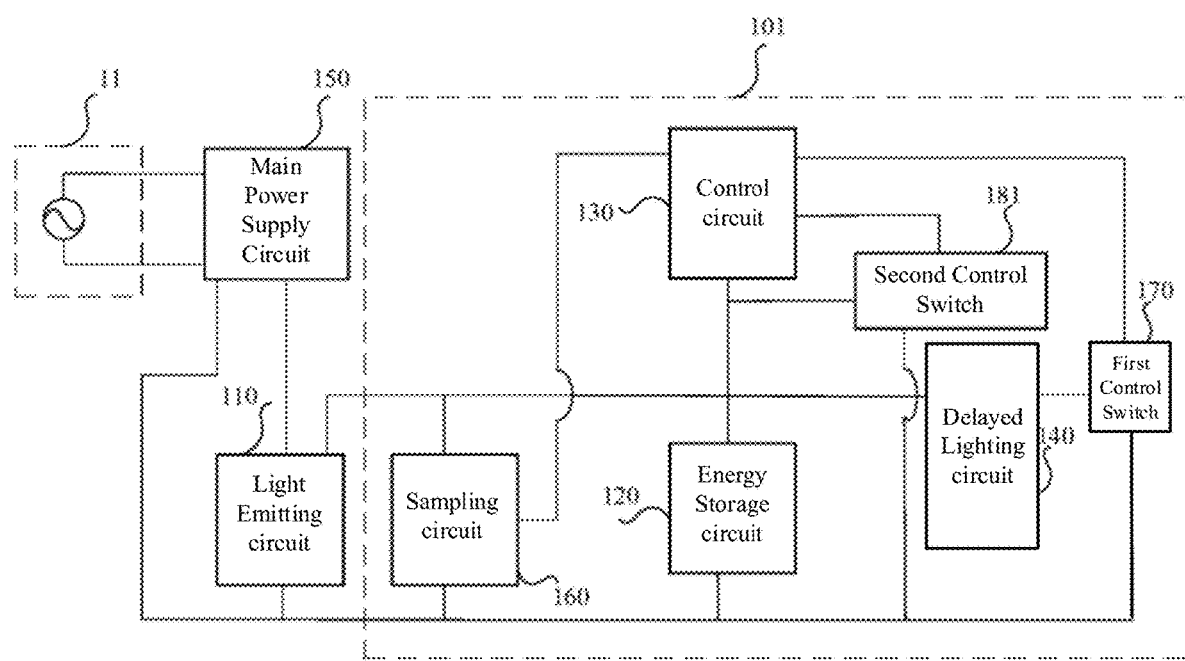
FIG. 5 is another schematic structural diagram of a delayed lighting system according to an embodiment of the disclosure.

As shown in FIG. 5, the instantaneous discharge circuit 180 includes a second control switch 181. The second control switch 181 is connected to the control circuit 130 and the energy storage circuit 120, respectively. The second control switch 181 is configured to form a circuit loop with the energy storage circuit 120 when being controlled by the control circuit 130 to turn on, so that the electrical energy of the energy storage circuit 120 is instantly discharged.

In some embodiments, as shown in FIG. 5, the second control switch 181 includes three pins, and the three pins include a control pin. The control pin is connected to the control circuit 130. One of the three pins of the second control switch 181 except the control pin is connected to one terminal of the energy storage circuit 120, and the other pin is connected to the other terminal of the energy storage circuit 120. The second control switch 181 is a normally open switch. The control circuit 130 detects that the remaining electrical energy of the energy storage circuit 120 is lower than the preset electrical energy value, and/or the voltage of the energy storage circuit 120 is lower than the preset voltage value, and/or the lighting duration of the delayed lighting circuit 140 meets the preset duration, the second control switch 181 is controlled to be turned on. The second control switch 181 and the energy storage circuit 120 form a circuit loop. Since the resistance value of the second control switch 181 is less than the resistance value of the delayed lighting circuit 140, when the control switch 181 and the energy storage circuit 120 form a circuit loop, the delayed lighting circuit 140 is short-circuited, and the energy storage circuit 120 instantaneously discharges the electrical energy, so that the energy storage circuit 120 cannot supply power to the delayed lighting circuit 140, and the delayed lighting circuit 140 is turned off.

Figure 6:
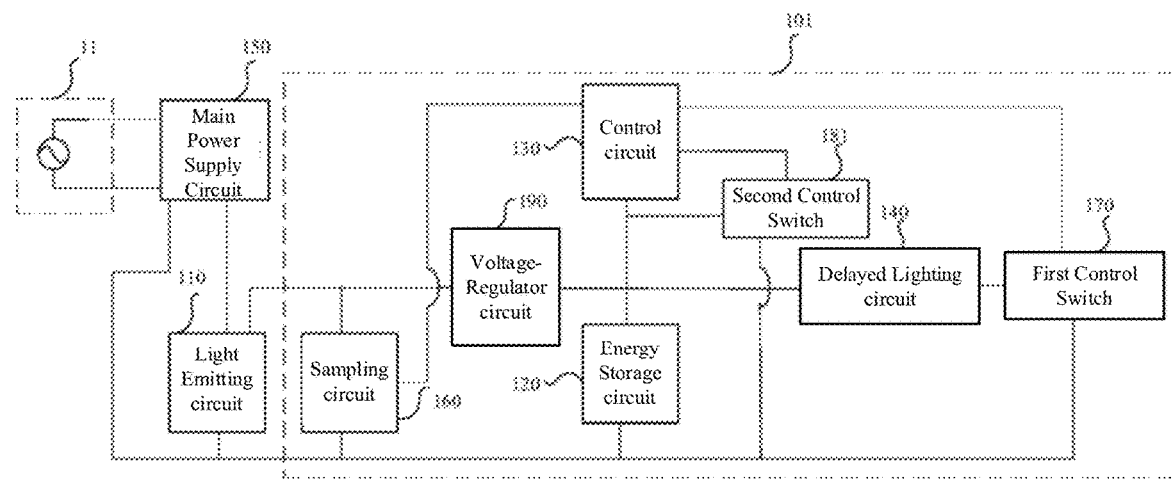
FIG. 6 is another schematic structural diagram of a delayed lighting system according to an embodiment of the disclosure.
Figure 7:
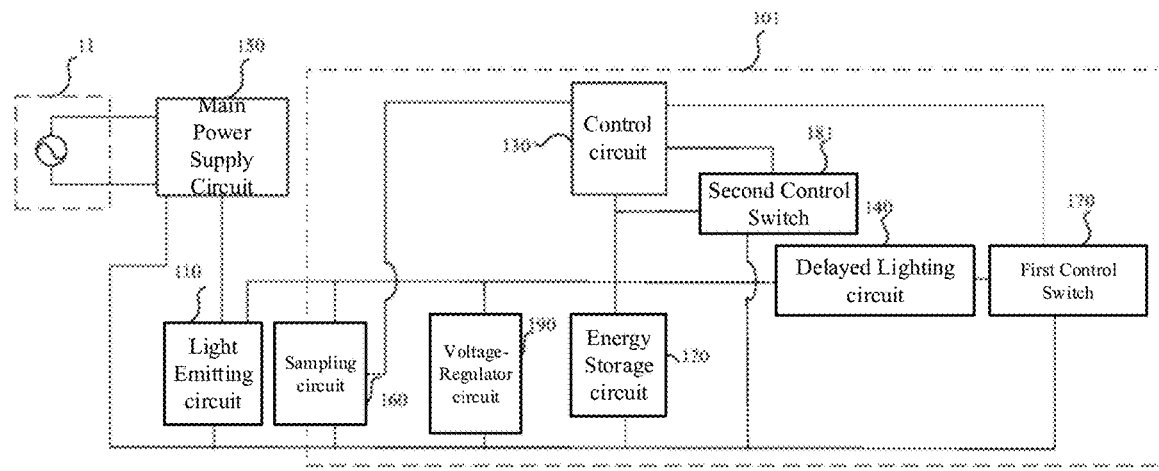
FIG. 7 is another schematic structural diagram of a delayed lighting system according to an embodiment of the disclosure.

In some embodiments, as shown in FIG. 6 and FIG. 7, the delayed lighting system 100 according to some embodiments of the present disclosure may include a voltage-regulator circuit 190. The voltage-regulator circuit 190 is connected to the energy storage circuit 120 and configured to control the electrical energy input to the power storage circuit 120. For example, when the mains electricity 11 charges the energy storage circuit 120, and when the mains electricity 11 fluctuates greatly, the voltage-regulator circuit 190 can output a substantially constant voltage to the energy storage circuit 120.

In some embodiments, the voltage-regulator circuit 190 may be a voltage-regulator tube or a voltage-regulator circuit.

The voltage-regulator tube is also called voltage-regulator diode, or Zener diode. Unlike ordinary diodes, when Zener diode works in a reverse breakdown state, its working current changes within a wide range while the voltage across it is basically unchanged.

The voltage-regulator circuit refers to a power supply circuit that can maintain the output voltage basically unchanged when the input grid voltage fluctuates or the load changes. In some embodiments, the voltage-regulator circuit may be a DC voltage-regulator circuit or an AC voltage-regulator circuit.

In some embodiments, as shown in FIG. 6, the voltage-regulator circuit 190 and the energy storage circuit 120 are connected in series. When the voltage-regulator circuit 190 is a voltage-regulator tube, the voltage-regulator tube works in a reverse breakdown state.

In some embodiments, as shown in FIG. 7, the voltage-regulator circuit 190 and the energy storage circuit 120 are connected in parallel.

Figure 8:
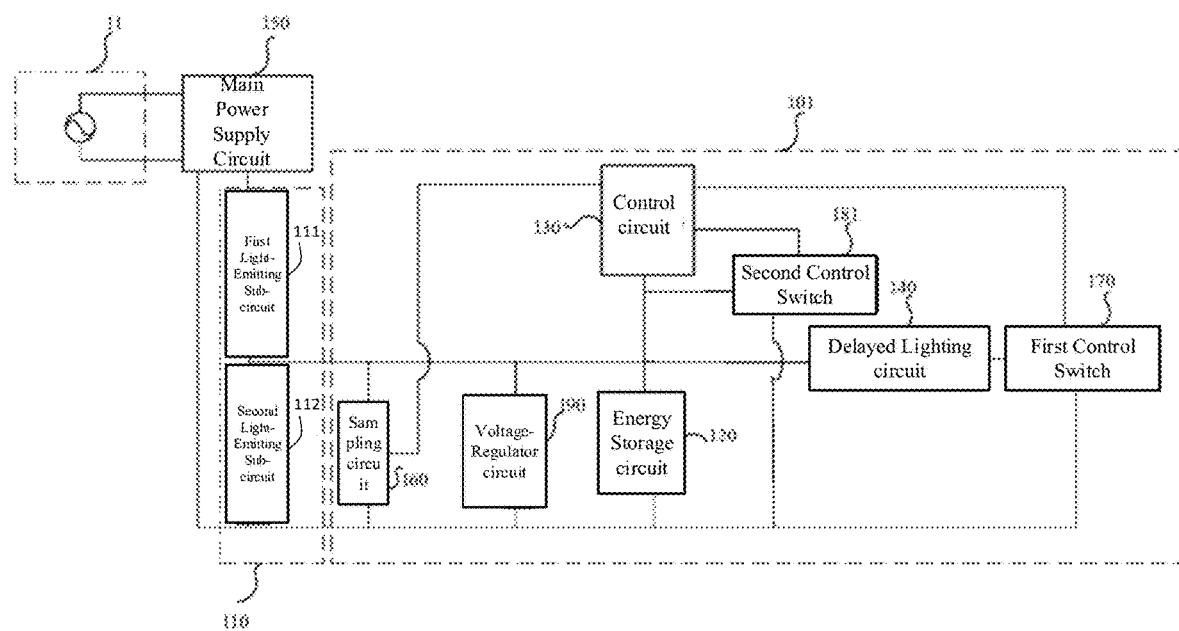
FIG. 8 is another schematic structural diagram of a delayed lighting system according to an embodiment of the disclosure.

As shown in FIG. 8, the light emitting circuit 110 according to some embodiments of the present disclosure may include a first light-emitting sub-circuit 111 and a second light-emitting sub-circuit 112. The delayed power supply circuit 101 described in the embodiments of the present disclosure is connected to the second light-emitting sub-circuit 112, that is, the control circuit 130 determines whether to control the delayed lighting circuit 140 to emit light according to the electrical signal of the second light-emitting sub-circuit 112.

In some embodiments, as shown in FIG. 8, the connection of the sampling circuit 160 and the second light-emitting sub-circuit 112 is configured to collect electrical signals of the second light-emitting sub-circuit 112 in real time (for example, collecting electrical signals at both ends of the second light-emitting sub-circuit 112), and send the collected electrical signals to the control circuit 130. When the control circuit 130 detects that the electrical signal of the second light-emitting sub-circuit 112 is a high level signal, it determines that the main power supply circuit 150 supplies power to the second light-emitting sub-circuit 112. At this time, the mains electricity 11 charges the energy storage circuit 120. When the control circuit 130 detects that the electrical signal of the second light-emitting sub-circuit 112 is a low level signal, it determines that the main power supply circuit 150 stops supplying power to the second light-emitting sub-circuit 112. The control circuit 130 controls the first control switch 170 to be turned on to make the energy storage circuit 120 connected to the delayed lighting circuit 140, so that the energy storage circuit 120 supplies power to the delayed lighting circuit 140, and the delayed lighting circuit 140 emits light.

In some embodiments, when the delayed lighting circuit 140 emits light and when the control circuit 130 detects that the electrical signal of the second light-emitting sub-circuit 112 sent by the sampling circuit 160 is a high level signal, the control circuit 130 determines that the main power supply circuit 150 supplies power to the light emitting circuit 110 again. Further, the control circuit 130 may control the first control switch 170 to be turned off, so that the energy storage circuit 120 stops supplying power to the delayed lighting circuit 140, and the delayed lighting circuit 140 is turned off.

Figure 9:
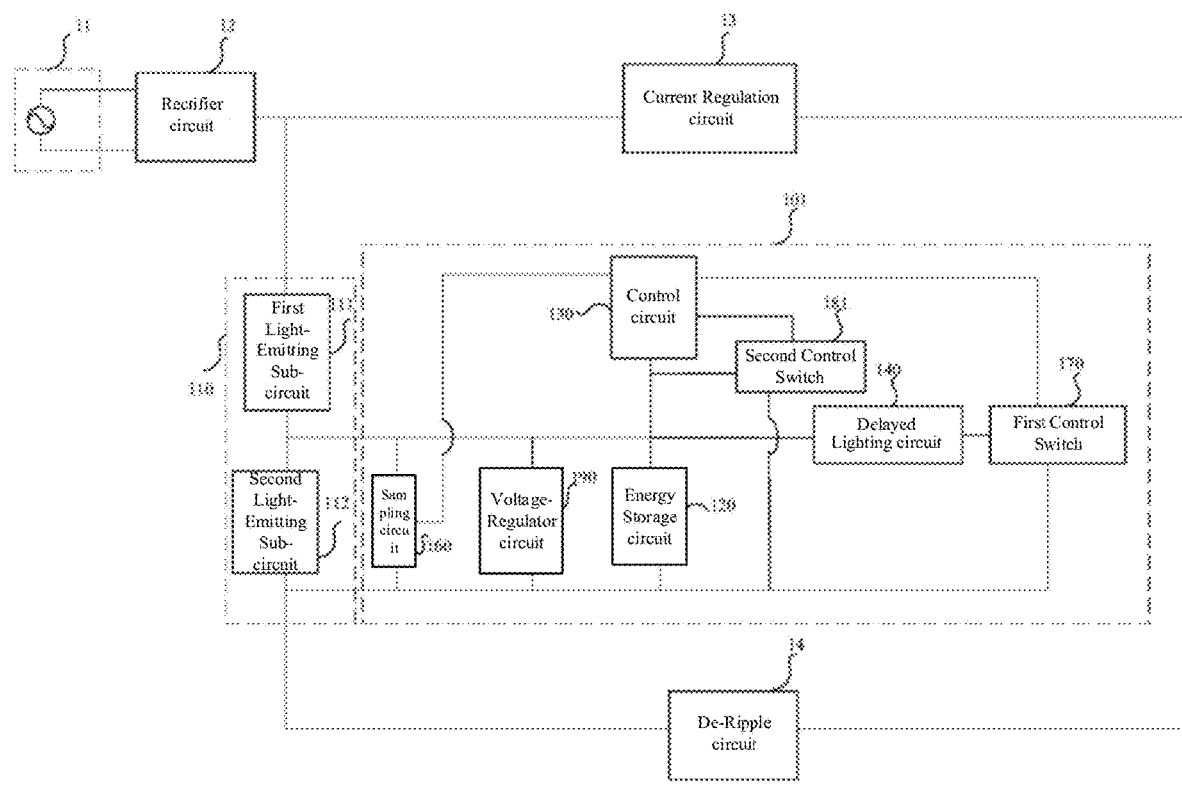
FIG. 9 is another schematic structural diagram of a delayed lighting system according to an embodiment of the disclosure.

As shown in FIG. 9, the delayed lighting system 100 according to some embodiments of the present disclosure may include a rectifier circuit 12. An input terminal of the rectifier circuit 12 is connected to the mains electricity 11, and an output terminal is connected to the main power supply circuit 150. The rectifier circuit 12 is configured to convert AC power of the mains electricity 11 into DC power.

In some embodiments, the rectifier circuit 12 may be a rectifier circuit, and the rectifier circuit may be a half-wave rectifier circuit, a full-wave rectifier circuit, or a bridge rectifier circuit, which is determined according to actual needs and is not limited in the embodiments of the disclosure.

As shown in FIG. 9, the main power supply circuit 150 according to some embodiments of the present disclosure may include a current regulation circuit 13. The current regulation circuit 13 is connected to the light emitting circuit 110 and is configured to adjust a brightness of the light emitting circuit 110 by adjusting the current input to the light emitting circuit 110.

In some embodiments, the main power supply circuit 150 according to some embodiments of the present disclosure may include a de-ripple circuit 14. The de-ripple circuit 14 is respectively connected to the current regulation circuit 13 and the light emitting circuit 110 for stroboscopic removal.

The delayed lighting system 100 according to some embodiments of the present disclosure is further described in detail with references to a circuit diagram of the delayed lighting system 100.

Figure 10:
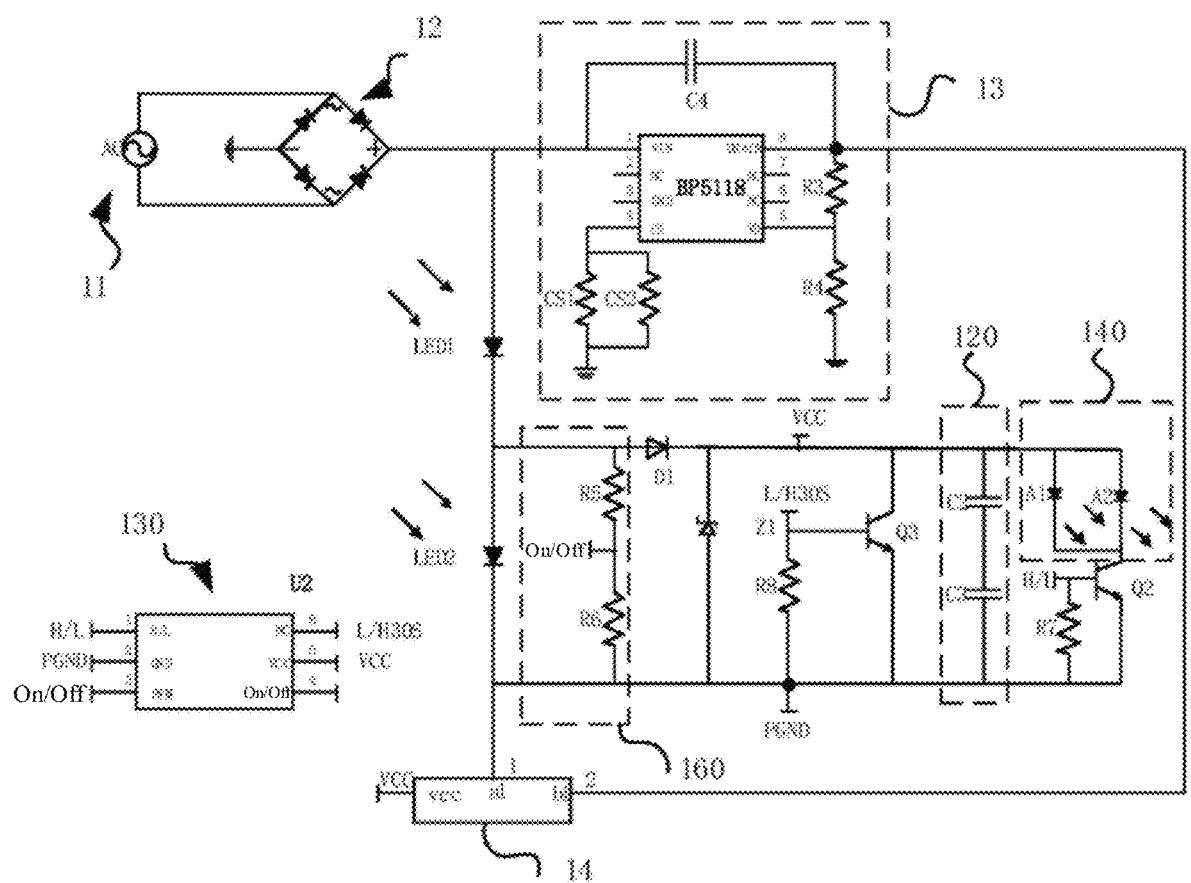
FIG. 10 is a circuit diagram of a delayed lighting system according to an embodiment of the disclosure.

As shown in FIG. 10, the light emitting circuit 110 includes a first light-emitting sub-circuit LED1 and a second light-emitting sub-circuit LED2, and the main power supply circuit 150 includes the current regulation circuit 13 and the de-ripple circuit 14. The current regulation circuit 13 includes a control chip, for example, a BP5118 chip. The control chip of the current regulation circuit 13 includes but is not limited to the BP5118 chip. The delayed power supply circuit 101 is connected to both terminals of the second light-emitting sub-circuit LED2. In some embodiments, the delayed power supply circuit 101 can also be connected to both terminals of the first light-emitting sub-circuit LED1, which is not limited in the embodiments of the present disclosure.

The delayed power supply circuit 101 includes a control circuit U2, energy storage circuits C2 and C3, delayed lighting circuits A1 and A2, a first control switch Q2, a second control switch Q3, sampling circuits R5 and R6, and a voltage-regulator circuit Z1. The control pin of the first control switch Q2 is connected to pin 1 at the control chip U2, the other two pins of the first control switch Q2 are respectively connected to the delayed lighting circuit 140 and the energy storage circuit 120, and the control pin of the first control switch Q2 is grounded through a resistor R7. The control pin of the second control switch Q3 is connected to pin 6 at the control chip U2, one pin of the second control switch Q3 is connected to element C2 of the energy storage circuit, the other pin of the second control switch Q3 is connected to element C3 of the energy storage circuit, and the control pin of the second control switch Q3 is grounded through a resistor R8. The voltage-regulator circuit Z1 is connected to the energy storage circuit 120. The two collection terminals of the sampling circuit 160 are respectively connected to the light emitting circuit 110, for example, to two terminals of the second light-emitting sub-circuit LED2, and the output terminal (for example, ON/OFF) of the sampling circuit 160 is connected to pin 3 at the control chip.

In actual use, when the main power supply circuit 150 is turned on, the mains electricity 11 outputs electrical energy through the rectifier circuit 12 to supply power to LED1 and LED2, and LED1 and LED2 emit light. The current regulation circuit 13 can adjust the current input to LED1 and LED2, thereby realizing the brightness adjustment of LED1 and LED2. The sampling circuits R5 and R6 collect the electrical signal of LED2 in real time, and send the collected electrical signal to the control circuit 130 through the output terminal. When the control circuit 130 determines that the electrical signal of LED2 collected by the sampling circuit 160 is a high level signal, it determines that the main power supply circuit 150 supplies power to the light emitting circuit 110. Further, the rectified mains electricity 11 charges the energy storage circuit elements C2 and C3.

When the control circuit 130 determines that the electrical signal of LED2 collected by the sampling circuit 160 is a low level signal, the control circuit 130 determines that the main power supply circuit 150 stops supplying power to the light emitting circuit 110, and the light emitting circuit 110 is turned off. At this time, the control circuit 130 controls the first control switch Q2 to be turned on through pin 1. The energy storage circuits C2 and C3 form a circuit loop with the delayed lighting circuit elements A1 and A2 and the first control switch Q2, the energy storage circuits C2 and C3 supply power to the delayed lighting circuit elements A1 and A2, and the delayed lighting circuits A1 and A2 emit light.

In some embodiments, the control circuit 130 detects that the remaining electrical energy of the energy storage circuit 120 is lower than the preset electrical energy value, and/or the voltage of the energy storage circuit 120 drops below the preset voltage value, and/or the lighting duration of the delayed lighting circuits A1 and A2 meet the preset duration (for example, 30 s), the first control switch Q2 is controlled to turn off through pin 1. Further, the energy storage circuits C2 and C3 stop supplying power to the delayed lighting circuits A1 and A2, and the delayed lighting circuit A1 and A2 are turned off In some embodiments, the control circuit 130 detects that the remaining electrical energy of the energy storage circuit 120 is lower than the preset electrical energy value, and/or the voltage of the energy storage circuit 120 drops below the preset voltage value, and/or the lighting duration of the delayed lighting circuits A1 and A2 meet the preset duration (for example, 30 s), the second control switch Q3 is controlled to turn off through pin 6. Further, the second control switch Q3 forms a circuit with the energy storage circuits C2 and C3, and the delayed lighting circuit A1 and A2 are short-circuited and turned off.

In the delayed lighting system according to the embodiments of the present disclosure, when the main power supply circuit stops supplying power to the light emitting circuit and the light emitting circuit is turned off, the control circuit can control the energy storage circuit to supply power to the delayed lighting circuit, so that the delayed lighting circuit emits light to realize the delayed lighting, thereby avoiding the safety risks caused by users moving in the dark and improving the user's lighting experience.

The present disclosure has been described above using embodiments, but the technical scope of the present disclosure is not limited to the scope described in the above embodiments. It is obvious to those skilled in the art that various changes or improvements can be made to the above-described embodiments. All such changes or improvements can be included in the scope of the present disclosure.

What is claimed is:

1. A delayed lighting system comprising:
a light emitting circuit;
a main power supply circuit connected to the light emitting circuit;
a delayed lighting circuit;
an energy storage circuit configured to store electrical energy from a mains electricity when the main power supply circuit supplies power to the light emitting circuit;
a control circuit connected to the energy storage circuit, the light emitting circuit, and the delayed lighting circuit respectively; and
an instantaneous discharge circuit connected to the control circuit, wherein:
when the main power supply circuit stops supplying power to the light emitting circuit, the control circuit is configured to control the energy storage circuit to supply power to the delayed lighting circuit and the delayed lighting circuit is configured to emit light;
the control circuit is further configured to: control the energy storage circuit to stop supplying power to the delayed lighting circuit when delayed lighting meets a preset condition, and connect the energy storage circuit to the instantaneous discharge circuit when the delayed lighting meets the preset condition; and
the instantaneous discharge circuit is configured to instantaneously discharge the electrical energy of the energy storage circuit when being connected to the energy storage circuit.

2. The delayed lighting system of claim 1, further comprising:
a sampling circuit respectively connected to the control circuit and at least one lamp bead of the light emitting circuit, wherein:
the sampling circuit is configured to collect an electrical signal of the at least one lamp bead of the light emitting circuit and send the collected electrical signal to the control circuit; and
the control circuit is configured to determine whether the main power supply circuit supplies power to the light emitting circuit according to the electrical signal collected by the sampling circuit.

3. The delayed lighting system of claim 2, wherein:
the light emitting circuit includes a first light-emitting sub-circuit and a second light-emitting sub-circuit;
the sampling circuit is connected to the second light-emitting sub-circuit to collect the electrical signal of the second light-emitting sub-circuit.

4. The delayed lighting system of claim 1, further comprising:
a first control switch respectively connected to the control circuit, the delayed lighting circuit, and the energy storage circuit, wherein:
the control circuit is configured to control connection and disconnection between the energy storage circuit and the delayed lighting circuit by turning on and off the first control switch.

5. The delayed lighting system of claim 1, wherein:
the instantaneous discharge circuit includes a second control switch connected to the control circuit and the energy storage circuit, respectively; and
the second control switch is configured to form a circuit loop with the energy storage circuit when the control circuit controls the second control switch to turn on, so that the electrical energy of the energy storage circuit is instantly discharged.

6. The delayed lighting system of claim 1, wherein the delayed lighting meeting the preset condition includes at least one of:
a remaining electrical energy of the energy storage circuit being lower than a preset electrical energy value;
a voltage of the energy storage circuit dropping below a preset voltage value; or a lighting duration of the delayed lighting circuit reaching a preset duration.

7. The delayed lighting system of claim 1, further comprising:
a voltage-regulator circuit connected to the energy storage circuit and configured to control an electrical energy input to the energy power storage circuit.

8. The delayed lighting system of claim 7, wherein:
the voltage-regulator circuit and the energy storage circuit are connected in series or in parallel.

* * * * *